United States Patent [19]
Behrens

[11] Patent Number: 5,390,442
[45] Date of Patent: Feb. 21, 1995

[54] MULTILAYER VEGETATION ELEMENT

[76] Inventor: Wolfgang Behrens, Trespenmoor 25, W-2833 Gross Ippener, Germany

[21] Appl. No.: 945,678

[22] Filed: Sep. 16, 1992

[30] Foreign Application Priority Data

Jun. 12, 1992 [DE] Germany ............... 4219275

[51] Int. Cl.6 .................................. A01G 31/00
[52] U.S. Cl. ............................... 47/59; 47/66; 47/83
[58] Field of Search ................. 47/59, 66, 82, 83

[56] References Cited

U.S. PATENT DOCUMENTS 4,135,330  1/1979  Aoyama .................. 47/66 S

FOREIGN PATENT DOCUMENTS

| 0310510 | 4/1989 | European Pat. Off. | 47/59 |
| 2438300 | 8/1974 | Germany . | |
| 3041534 | 6/1982 | Germany | 47/83 |
| 3312402 | 10/1984 | Germany | 47/66 S |
| 0231416 | 2/1986 | Germany . | |
| 3529717 | 3/1987 | Germany | 47/66 S |
| 3805069 | 2/1988 | Germany . | |
| 3636771 | 5/1988 | Germany | 47/66 |
| 3708491 | 9/1988 | Germany | 47/83 |
| 3815662 | 12/1988 | Germany | 47/83 |
| 3936264 | 5/1991 | Germany | 47/66 S |
| 62-048324 | 3/1987 | Japan | 47/59 |
| 1202226 | 8/1989 | Japan | 47/59 |
| 2234612 | 9/1990 | Japan | 47/59 |
| 0664184 | 2/1988 | Switzerland | 47/83 |
| 48506 | 6/1985 | U.S.S.R. | 47/59 |
| 82/00169 | 1/1982 | WIPO | 47/66 S |
| 87/00394 | 1/1987 | WIPO | 47/59 |
| 0475489A1 | 3/1992 | WIPO | 47/66 S |

*Primary Examiner*—Ramon S. Britts
*Assistant Examiner*—Joanne C. Downs
*Attorney, Agent, or Firm*—Collard & Roe

[57] ABSTRACT

A multilayer vegetation element is made up of a culture layer for holding vegetation, and a separation layer, and wherein a fire-retardant layer made of non-combustible material is arranged on top of the separation layer and below the culture layer.

19 Claims, 1 Drawing Sheet

MULTILAYER VEGETATION ELEMENT

BACKGROUND OF THE INVENTION

1. Field of the Invention

The present invention relates to a multilayer vegetation element including a culture layer for vegetation, and a separation layer, wherein a fire-retardant layer made of non-combustible material is arranged on top of the separation layer and below the culture layer.

2. The Prior Art

Vegetation elements are known, for example, from DE-PS 24 38 300, DE-OS 38 05 069, or EP-OS 0 231 416.

Vegetation elements of this type serve the purpose of permitting roof or wall foliation in buildings in order to compensate for the fact that the natural vegetation in a locality is destroyed by the increasingly denser settlement of population.

In addition to the advantageous effect of such vegetation elements on the environment, such as the reduction of the carbon dioxide level in the air and the production of oxygen, as well as the creation of a balanced climate, excessive cooling in the winter is prevented, and excessive heating in the summer is prevented. This enhances the room climate in buildings with foliated roofs and facades.

It has been found that especially after long dry periods, the rain water stored in the vegetation elements evaporates, so that the organic components are in danger in case of a fire.

In the event of being struck by lightning, or if glass debris or also if burning cigarettes are thrown onto the foliated surfaces, this may then cause an ignition of the combustible components that not only destroys the vegetation element itself, but also spreads to the adjacent roof.

SUMMARY OF THE INVENTION

It is an object of the present invention to provide a multilayer vegetation element which, in the case of fire of the organic components of the vegetation element, will prevent spreading of the fire to adjacent parts of the building.

A further embodiment of the invention is directed to providing a multilayer vegetation element comprising a culture layer for vegetation, and a separation layer, wherein a fire-retardant layer made of non-combustible material is arranged on top of the separation layer and below the culture layer.

Through the use of the fire-retardant layer, fire which can start in the plant and culture layer, as well as fire in other organic components of the vegetation element, is prevented from spreading in the direction of the building. This is achieved by the fact that the fire-retardant layer itself does not contain any combustible substances which can further feed the fire. Additionally, there is a layer of thermal insulation which prevents ignition of combustible parts of the building through conduction or radiation of heat from the fire.

The fire-retardant layer preferably consists of rock wool, and has a thickness of between 1 cm to 10 cm.

The fire-retardant layer is not combustible. It possesses good thermal insulation properties, and additionally, is resistant to weathering and to attack by various corrosive chemicals and erosion through time. The thickness is selected in such a way that it is in a corresponding relation to the vegetation. With a small quantity of vegetation, which in case of fire would also develop relatively little heat, a relatively thin layer suffices as the fire-retardant layer. On the other hand, with a large quantity of vegetation, a thicker layer is selected as the fire-retardant layer in order to better withstand the greater generation of heat.

The fire-retardant layer may be an integral component of the single culture layer. In this case, the top part of the single-culture layer serves as the culture layer and receives the roots, whereas the bottom part is free of roots, and acts predominantly or exclusively to bear the burden of insulation in the event of fire.

On top of the culture layer, a cover layer may be arranged. This cover layer protects against erosion of the soil, and against feeding by animals. This layer is particularly advantageous if the vegetation element is, for example, inclined on walls or slanted roofs. Additionally, the cover layer inhibits removal by wind and water of germinated seeds, or of young plants or seedlings whose roots have not yet penetrated into the culture layer.

The cover layer may consist of a plastic fabric resistant to ultraviolet light, or also consist of coconut fiber fabric.

Materials suitable for the culture layer include rock wool, as previously discussed, and also substrate substitutes such as coconut fiber, cotton, sisal or straw. Furthermore, the culture layer may include a nutrient medium, so that the plants can always be supplied with nutrients.

Materials suitable for the separation layer include fleece material made of a synthetic substance such as a thermoplastic, as well as a natural substance such as jute or felt. Also, it is possible to manufacture the separation layer from a perforated metal foil, such as aluminum foil.

The separation layer provides that the precipitated rainwater or any added water required for plant growth can be stored in the culture layer and supplied to the plants. Additionally, the water can escape downwardly, but only to a minor extent. However, the separation layer is not completely water-tight, but permits, during heavy precipitations, for excess water to be discharged downwardly due to the hydrostatic pressure, and removed from below via a roof drain.

With flat roofs, it may be useful to arrange beneath the separation layer a drainage layer comprising a loop fabric made of plastic, a coconut fiber tangle, or bulk construction materials. In this regard, a larger cross-section is obtained, so that even with a minor slant of the roof, excess water can flow to the roof gutters and can be drained therefrom.

In another embodiment, the individual layers can be glued or sewed together. In this way, it is possible to supply multi-layered vegetation elements pre-fabricated on rolls, and to later mount them or place them on the building, as a complete unit.

In a preferred embodiment, it is possible that the culture layer can be provided with seeding, or can be prefoliated. However, it is possible to arrange the vegetation element first without seeding or foliation, and to sow the seeds later. When using a cover layer, sown seeds would be protected against erosion and feeding animals, and the layer can germinate and take root in the culture layer, with minimum impediment and interference.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
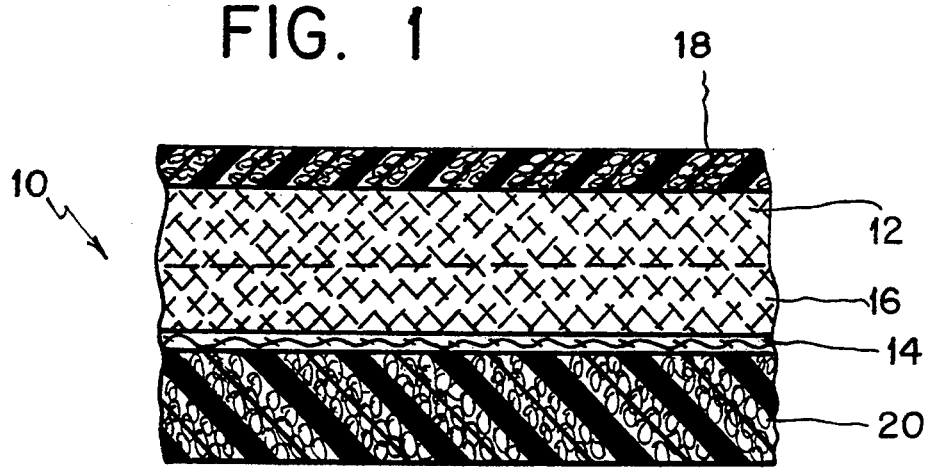
FIG. 1 shows a cross-section through a first embodiment of a multilayer vegetation element.

Turning now in detail to the drawings, FIG. 1 shows the multilayered vegetation element 10 which comprises a top cover layer 18 made of an ultraviolet-light-stable plastic loop fabric. The thickness of this cover layer 18 is about 5 mm. Underneath, a culture layer 12 and a fire-retardant layer 16 are disposed, both comprised of rock wool.

The rock wool has hydrophilic properties and is 20 mm thick. In this connection, the culture layer 12 disposed on top accounts for about 10 mm, and the fire-retardant layer 16 disposed underneath accounts for another 10 mm. However, no clear separation needs to be between these two layers, because the culture layer 12 has fire-retardant properties as well. The fire-retardant layer 16 can supplement the culture layer 12 as well, in that it accommodates part of the water and of the root system of the foliage.

The lower fire-retardant layer 16 is joined by a separation layer 14 made of fleece material which has the unit weight which ranges from 50 g/m² to 1,000 g/m². A draining or drainage layer 20 is, in turn, arranged beneath the separation layer 14. Similar to the cover layer 18, the draining layer comprises a loop fabric made of plastic such as a thermoplastic. However, the draining layer 20 has a layer thickness of 15 mm, so that an adequate cross-section is available for the discharge of excess precipitation. Depending on the precipitation that is to be expected, and on the slant of the roof, the draining layer 20 may have a layer thickness between 5 mm and 50 mm.

Figure 2:
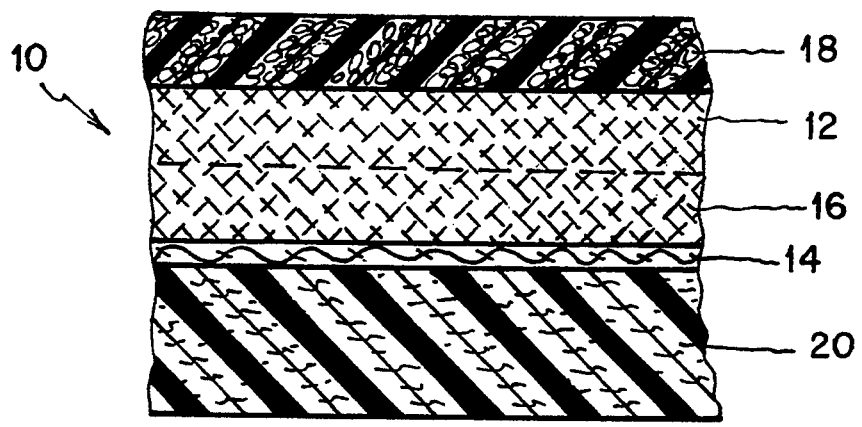
FIG. 2 shows a cross-section through a second embodiment of a vegetation element.

An additional embodiment for the vegetation element 10 is shown in FIG. 2 and has a similar structure in terms of layers. However, instead of the plastic loop fabric for the cover layer 18 and the draining layer 20, fiber tangles or weaves made of coconut fiber can be built. The preferred layer thickness of the cover layer 18 is 10 mm; the preferred thickness of the draining layer 20 is 20 mm. In addition, another material is used for the separation layer 14, namely, jute or felt. Instead of the latter, the use of geotextile is possible as well.

Therefore, while a combination of synthetic and natural materials is selected for the structure of the vegetation element 10 shown in FIG. 1, natural materials are exclusively used for the embodiment shown in FIG. 2.

It is also possible to construct a structure in which different combinations are used. For example, it may be useful to use, instead of the draining layer 20 of coconut fiber shown in FIG. 2, a plastic loop fabric or bulk construction materials such as gravel, lava, expanded clay, or liapur. Especially with extensive flat roofs, there is the risk that excess water will remain in the draining layer 20 over a longer period and increasing the risk of rot, so the materials present in this layer have to be resistant to decay. In this case, therefore, the aforementioned alternatives would be preferable over a draining layer 20 made of coconut fiber tangle.

While several embodiments of the present invention have been shown and described, it is to be understood that many changes and modifications may be made thereunto without departing from the spirit and scope of the invention as defined in the appended claims.

What is claimed is:

1. A multilayer vegetation element comprising:
   a culture layer for holding vegetation;
   a separation layer; and
   a fire-retardant layer consisting of non-combustible material arranged on top of the separation layer and below the culture layer, wherein the fire-retardant layer consists of rock wool and has a thickness of between 1 cm and 10 cm.

2. The vegetation element as defined in claim 1, wherein the fire-retardant layer is an integral component of the culture layer.

3. The vegetation element as defined in claim 1, further comprising
   a cover layer positioned on top of the culture layer.

4. The vegetation element as defined in claim 3, wherein the cover layer has a thickness between 5 mm and 10 mm.

5. The vegetation element as defined in claim 3, wherein the cover layer comprises an ultraviolet light-stable loop fabric made of plastic.

6. The vegetation element as defined in claim 3, wherein the cover layer consists of a coconut fiber tangle.

7. The vegetation element as defined in claim 1, wherein the culture layer comprises an organic, structurally stable substrate selected from the group consisting of coconut fiber, cotton, sisal or straw.

8. The vegetation element as defined in claim 1, wherein the culture layer further comprises a nutrient medium.

9. The vegetation element as defined in claim 1, wherein the separation layer comprises a fleece material made of plastic, jute or felt.

10. The vegetation element as defined in claim 1, wherein the separation layer consists of a perforated foil.

11. The vegetation element as defined in claim 1, wherein the separation layer has a unit weight of between 50 g/m² and 1,000 g/m².

12. The vegetation element as defined in claim 1, further comprising
    a draining layer positioned beneath the separation layer.

13. The vegetation element as defined claim 12, wherein the draining layer comprises a loop fabric made of plastic.

14. The vegetation element as defined in claim 12, wherein the draining layer is made of coconut fiber knit fabrics.

15. The vegetation element as defined in claim 12, wherein the draining layer is a bulk construction material selected from the group consisting of gravel, lava, expanded clay, liapur, and the combinations thereof.

16. The vegetation element as defined in claim 1, wherein the individual layers are glued to one another.

17. The vegetation element as defined in claim 1, wherein the individual layers are sewed to one another.

18. The vegetation element as defined in claim 1, wherein the culture layer is provided pre-seeded.

19. The vegetation element as defined in claim 1, wherein the culture layer is foliated.

* * * * *